United States Patent
Wilson et al.

(10) Patent No.: US 7,734,686 B2
(45) Date of Patent: Jun. 8, 2010

(54) MARKUP METHOD FOR MANAGING RICH CLIENT CODE AND EXPERIENCES USING MULTI-COMPONENT PAGES

(75) Inventors: Richard M. Wilson, Dover, NH (US); Douglass J. Wilson, Cambridge, MA (US); Carl J. Kraenzel, Boston, MA (US); Jeffrey T. Calow, Westford, MA (US)

(73) Assignee: International Business Machines Corporation, Armonk, NY (US)

( * ) Notice: Subject to any disclaimer, the term of this patent is extended or adjusted under 35 U.S.C. 154(b) by 1334 days.

(21) Appl. No.: 11/042,432

(22) Filed: Jan. 25, 2005

(65) Prior Publication Data

US 2006/0168512 A1 Jul. 27, 2006

(51) Int. Cl.
G06F 15/16 (2006.01)
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)

(52) U.S. Cl. .................. 709/203; 709/219; 715/234

(58) Field of Classification Search ......... 709/202–207, 709/217–230, 238; 463/1; 715/205, 234–243, 715/760
See application file for complete search history.

(56) References Cited

U.S. PATENT DOCUMENTS

| | | | |
|---|---|---|---|
| 5,003,307 A | 3/1991 | Whiting et al. | |
| 5,664,182 A | 9/1997 | Nierenberg et al. | |
| 6,216,152 B1 | 4/2001 | Wong et al. | |
| 6,643,650 B1* | 11/2003 | Slaughter et al. | 707/10 |
| 6,654,765 B2 | 11/2003 | Wong et al. | |
| 6,704,791 B1* | 3/2004 | Harris | 709/231 |
| 7,506,006 B2* | 3/2009 | Vadlamani et al. | 707/201 |
| 2003/0080977 A1 | 5/2003 | Scott et al. | |
| 2003/0185247 A1 | 10/2003 | Chen et al. | |
| 2004/0002843 A1* | 1/2004 | Robarts et al. | 703/13 |
| 2004/0005044 A1 | 1/2004 | Yeh | |
| 2004/0031058 A1* | 2/2004 | Reisman | 725/112 |
| 2004/0172402 A1 | 9/2004 | Jabri et al. | |
| 2004/0186841 A1 | 9/2004 | Heuer et al. | |
| 2004/0190784 A1 | 9/2004 | Ozawa et al. | |

(Continued)

OTHER PUBLICATIONS

Abrahams, Peter (2004). Thick Client Bad, Thin Client Bad, IBM good?. Bloor Research, IT Anaysis Communications LTD, 1-2.*

Primary Examiner—Asad M Nawaz
(74) Attorney, Agent, or Firm—David A. Dagg (57) ABSTRACT

A mark-up method and system that enables server-managed thick client capabilities using a thin client server, framework, and administration. Active content such as program code, service, and data components, are driven to a thick client platform. The thick client platform is defined through a combination of thick client components, while the thick client components and user interface experience are centrally managed. The thick client container can operate to embed thin client container components, such as a browser, and the thick client container itself can be initially deployed over a network using a thin client.

14 Claims, 6 Drawing Sheets

U.S. PATENT DOCUMENTS

| | | | |
|---|---|---|---|
| 2004/0268344 A1* | 12/2004 | Obilisetty | 717/175 |
| 2005/0005259 A1* | 1/2005 | Avery et al. | 717/103 |
| 2005/0021756 A1* | 1/2005 | Grant | 709/226 |
| 2006/0080468 A1* | 4/2006 | Vadlamani et al. | 709/250 |
| 2006/0218228 A1* | 9/2006 | Mouline | 709/203 |

* cited by examiner

```
<tc_pages>
  <page_metadata count="3">
    <page name="Messaging" url="/lwp/myworkplace/Messaging" markups="html,tcml" current="yes" />

</page_metadata>
  <col_container>
    <row_container>
      <col_container>
        <tc_view   name="com.ibm.eworkplaces.pim.ui.navigator.views.NavigatorView"
                   folderid=""
                   ratio=".75"
                   visible="yes"
                   fixed="yes"
                   style=""
                   allowMultiple="">
          <updates>
            <feature name="com.ibm.lwp.wct.mymail.feature" server="http://wct1.notesdev.ibm.com/lwpupdate/wct" />
            <feature name="com.ibm.lwp.wct.mymailcommon.feature" server="http://wct1.notesdev.ibm.com/lwpupdate/wct" />
          </updates>
          <data />
        </tc_view>
        <tc_view   name="com.ibm.wkplc.bl.rcp.buddylist.BuddylistView"
                   folderid="main"
                   ratio=".45"
                   visible="no"
                   fixed="no"
                   style=""
                   allowMultiple="">
          <updates>
            <feature name="com.ibm.workplace.bl.view.feature" server="http://wct1.notesdev.ibm.com/wpupdate/wct" />
            <feature name="com.ibm.lwp.wct.mymailcommon.feature" server="http://wct1.notesdev.ibm.com/wpupdate/wct" />
          </updates>
          <data />
        </tc_view>
```

*FIG. 6*

MARKUP METHOD FOR MANAGING RICH CLIENT CODE AND EXPERIENCES USING MULTI-COMPONENT PAGES

FIELD OF THE INVENTION

The present invention relates generally to user interfaces, and more specifically to a markup method and system for managing rich client code and experience using portal pages.

BACKGROUND OF THE INVENTION

Since at least the 1980s, the client/server computing model has become increasingly adopted for a wide variety of software applications. Using this approach, client software on the user's computer system interacts with server software operating on one or more remote computer systems.

Over time, what are referred to as "thin" and "thick" clients have evolved, together with thin client and thick client application platforms that provide run-time containers for clients of the corresponding type. Thick clients are typically standalone clients typically provide a solution to a particular problem, such as word processing. Thick clients are provided on a client computer system on top of a thick client application platform. WinForms from Microsoft® Corporation is an example of an existing thick client application platform. Though they provide rich functionality, such as responsiveness and a rich user interface, thick clients are expensive to deploy, upgrade, and administer. The thin client approach arose to address these issues, by providing a central server where applications can be deployed and accessed over a network connection through a thin client container, such as a browser program. When a thin client is used, all or most of the application processing is performed by the server. Advantages of the thin client approach are that the application can be centrally deployed and conveniently administered at the central server. The thin client approach requires fewer costly distributions of new application versions to the client computer system, since many changes or fixes can be accomplished at the server end. During operation, the client container basically requests content to be displayed, which is returned as a response document from the server, and then is simply rendered through the thin client to the user.

Although the thin client technique often reduces total cost of ownership, it is limited with respect to suitable application types, the richness that can be provided in the user interface, interaction speed, disconnected offline use, and overall user experience.

Some existing thick clients have attempted to address the aforementioned problems. For example, some thick clients can be deployed with the capability to be upgraded over a network. Such thick clients include RealPlayer® multi-media player provided by RealNetworks®, the Flash® graphics application from Macromedia®, and MS Windows® provided by Microsoft® Corporation. However, in order to effectively use many of these systems, the user often must have significant program compatibility information. Without access to and consideration of program interaction compatibility, settings, and configuration information, using many such systems may result in program malfunctions resulting in help desk calls.

Another existing solution has been to centrally deploy a thick client application to a central server that can then replicate the runtime and application state data for multiple users. An example of this approach is found in software provided by Citrix Systems, Inc. These systems are typically costly, do not operate across platforms, and depend on the ability of the software to properly replicate all appropriate runtime and configuration information.

Locked down client computer system desktop constructs provide some protections, including grants that permit and define new programs that can be installed, and what settings can be changed, if any. However, user-enabled customization is a limited solution, and can result in reduced user productivity.

To extend functionality for a specific thin client container, such as a browser, custom plugins can be employed that provide richness of experience for a particular solution. However, these extensions are built on the thin client framework, while browser extensions are not managed. Moreover, this approach is limited with respect to what functions are available, based on the sandbox model for code execution. In addition, well-meaning users can also turn their browsers into unmanaged thick clients by adding functional extensions.

For the reasons stated above and others, in order to address the issue of bridging the gap between thin and thick clients, there is a need for a server managed client platform that retains the benefits of a thick client, and having the server managed characteristics of a thin client. The system should further be able to use the same management systems as are used to manage thin client applications.

SUMMARY OF THE INVENTION

To address the above described and other deficiencies of the prior art, a markup method and system for managing rich client code and experience using multi-component pages is disclosed. The multi-component pages used in embodiments of the disclosed system may include, but are not limited to, portal pages. The disclosed system enables server-managed thick client capabilities using a thin client server, framework, and administration. In the disclosed system, active content such as program code, service, and data components, are driven to a thick client platform. The thick client platform is defined by a combination of thick client components, while the thick client components and user interface experience are centrally managed. The thick client container can operate to embed thin client container components, such as a browser, and the thick client container itself can be initially deployed over a network using a thin client.

Through the disclosed system, thin client frameworks, such as access control on the server, can be used to tailor thick client components to users, client devices, and/or applications. The thick client can run both thin and thick client components within in a centrally managed container, yielding remote control and management of the thick client from an administration system that is the same as that used for managing thin clients. Unified application development and management across thick and thin clients, as enabled by the disclosed system, extends upon and builds from application development systems, programming models, deployment models, management systems, which are already widely deployed as the basis of the industry thin client solutions. The benefits to extending based on existing thin client solutions include not having to manage disparate systems, train programmers to different programming models, and/or train specialized information technology (IT) administrators. Costs associated with having an unrelated central system for managing thin versus thick clients, e.g. Citrix software, are also avoided.

BRIEF DESCRIPTION OF THE DRAWINGS

In order to facilitate a fuller understanding of the present invention, reference is now made to the appended drawings.

These drawings should not be construed as limiting the present invention, but are intended to be exemplary only.

DETAILED DESCRIPTION OF EXEMPLARY EMBODIMENTS

Figure 1:
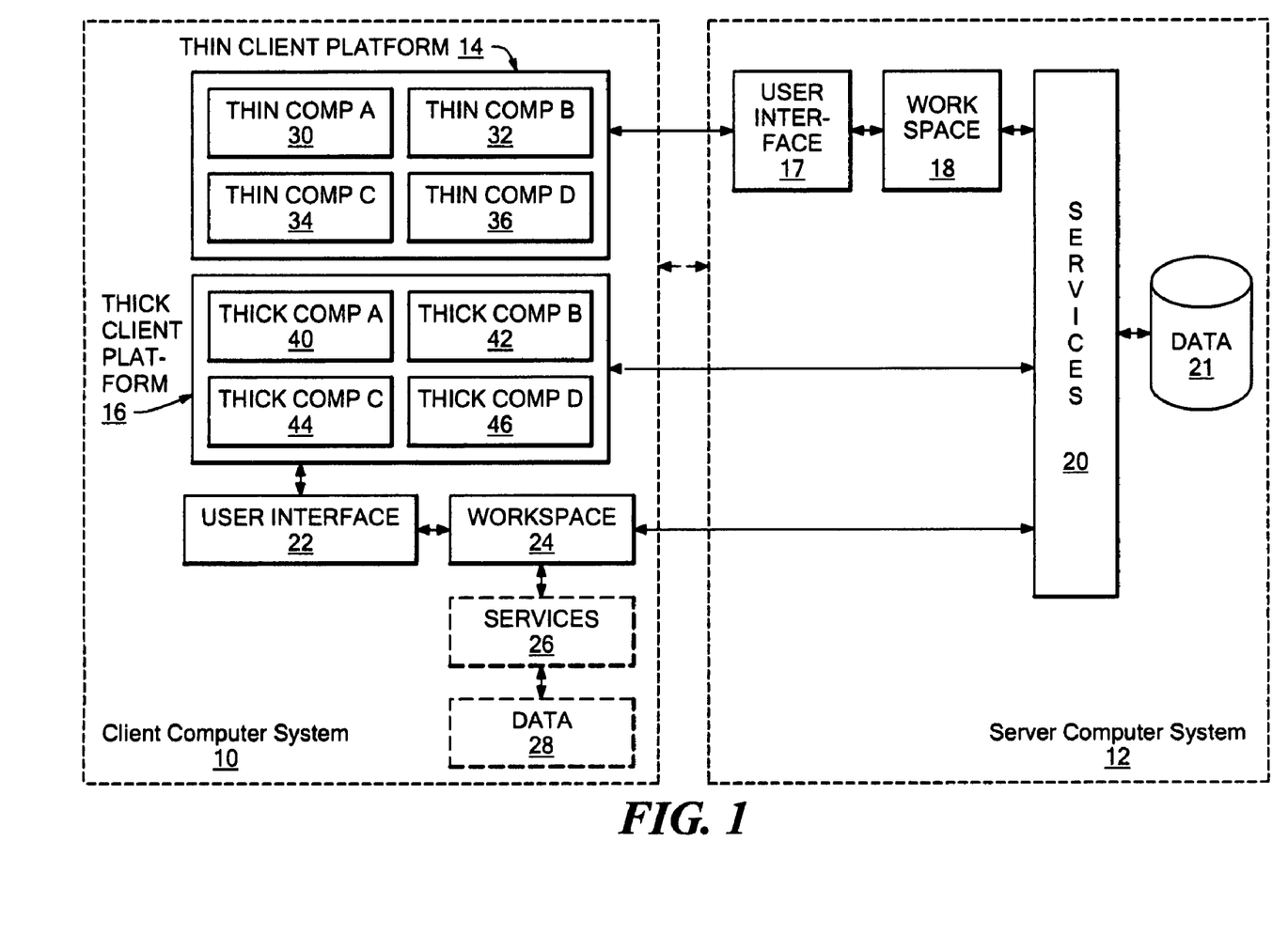
FIG. 1 shows software components executing on client and server computer systems in an illustrative embodiment.

As shown in FIG. 1, in an illustrative embodiment, a client computer system 10 is communicable with a server computer system 12, for example by way of a communication network such as the Internet, a Local Area Network (LAN), or any other specific kind of network. The server computer system 12 may be embodied to include one or more server systems. The client computer system 10 and server computer system 12 may consist of any specific type of computer system, for example including one or more processors, program memory for storing program code executable on the processor and data, secondary storage devices, input output devices, communication interfaces, in any specific combination or configuration. The client computer system 10 and server computer system 12 further may include operating system software for providing system services and controlling allocation of system resources among the software components executing on those computer systems.

The client computer system 10 includes a number of software components, including a thin client platform 14 and thick client platform 16. The client computer system 10 further includes a user interface component 22 and workspace component 24, as well as services and data components 26 and 28. The server computer system is shown including user interface 17, workspace 18, and services 20 software components.

During operation of the software components shown in FIG. 1, the thin client platform 14 operates to provide a number of applications, shown for purposes of explanation as thin component A 30, thin component B 32, thin component C 34, and thin component D 36. The thick client platform 16 may operate to provide a number of applications, shown for purposes of explanation as thick component A 40, thick component B 42, thick component C 44, and thick component D 46. The thick client platform 16 is operable to provide application components that offer equivalent or greater functionality with respect to those components provided through the thin client platform 14. For example, the thin client platform 14 may be operable to provide application components such as those associated with an electronic mail application, such as a message folder navigation tool, a contacts list, and an inbox. Similarly, the thick client platform 16 can be operated to provide application components including electronic mail application components, including a message folder navigation tool, a contacts list, an inbox, and the like. The thick client platform 16 may in fact provide a thick client component that consists of, or includes, a thin client platform. In this way, in the event that a given application or application component only has available markup for a thin client, the user can still access it through the thick client platform 16 by using a thin client platform embedded within the thick client platform 16.

A user would ordinarily not simultaneously invoke the same application component on both the thin client platform 14 and the thick client platform 16. However, in some circumstances, one platform may be more preferable. For example, when a user is traveling without their own computer, they may wish to access their electronic mail through a publicly available client computer system using a thin client platform such as a Web browser computer program. When the user returns from their trip, they may wish to access their electronic mail using a thick client platform on their own computer system. The disclosed system enables this kind of use model, and allows the same back end application data, such as received and sent electronic mail messages or other data, to be consistently and conveniently accessed through either of the thin or thick client platforms 14 and 16.

As further shown in FIG. 1, the thin client platform 14 communicates with a user interface component 17 on the server computer system 12, which in turn communicates through a workspace component 18 to access the application services 20. The workspace component 18 is a layer that is responsible for handling events, that includes delegates to the services 20, and that caches the value objects returned from the services 20. The services 20 access application data 21. The application data may be provided from any specific data source. The user interface 17 and workspace 18 can generally be considered session specific components, while the services 20 may generally be considered to be session independent resources. The server computer system 12 creates the user interface 17 based on value objects cached in the workspace 18.

In contrast with the thin client approach, the thick client 16 operates using a user interface component 22 and workspace component 24 stored and executing on the client computer system 10. Accordingly, the installed thick client platform 16 may be considered to include the session specific user interface 22 and workspace 24 components within the client computer system 10.

The user interface 22 and workspace 24 for the thick client platform 16 are designed and implemented specifically for operation on the client computer system 10, as opposed to the user interface 17 and workspace 18, which are designed and implemented for operation on the server computer system 12. For example, the user interface 17 may be embodied using a pre-packaged technique such as "Struts", which is a commercially available framework for writing Web-based applications in the Java programming language, that supports the Model-View-Controller (MVC) architecture. As it is generally known, Struts is deployed as Java Server Pages (JSPs) using special tags from the Struts tag library, which includes routines for building forms, HTML rendering, storing and retrieving data and business logic. The workspace 18 may, for example, be embodied using delegates to Enterprise Java Beans (EJBs), which are an exemplary software component providing a pure Java environment for developing and running distributed applications.

In contrast, the user interface 22 on the client computer system 10 may be embodied using some number of "widgets" that are software components that allow the user to interface with the application and the local operating system. These widgets include components for generating a collection of various specific graphical user interface display objects, such as buttons, dialog boxes, pop-up windows, pull down menus, icons, scroll bars, drop down lists, trees, resizable window edges, progress indicators, selection boxes, windows, tear-off menus, menu bars, toggle switches, forms, and others. In general, widgets are used to display information and invite the user to act in different ways. While the workspace 24 for the thick client platform 16 includes the same functionality as provided for the thin client platform 14 by the workspace 18, the workspace 24 additionally includes program logic for connecting to the services 20 on the server computer system 12 over a communications network connecting the client computer system 10 to the server computer system 12. The workspace 24 in the client may be embodied to include an event passing mechanism to communicate events between application components provided through the thick client platform 16.

In addition, some subset of the services and data used the application components association with operation of the thick client platform 16 may also be locally stored or cached on the client computer system 10, after being obtained from the server computer system 12, as shown in FIG. 1 by services 26 and data 28. User accesses to services and data on the server computer system 12 can be performed through either the thin client platform 14 or thick client platform 16. It should be noted that the same services from services layer 20, and data from data 21 on the server system 12 are available to components executing through either the thin client platform 14 or the thick client platform 16. This aspect of the disclosed system advantageously allows central management of services and data for both thin client and thick client enabled operations, and consistent user experiences across thin client platform and thick client application sessions.

While the user must have a communication connection with the server computer system 12 to work using the thin client platform 14, the thick client platform 14 enables at least partial disconnected operation using the local cached data 28 and services 26, when the server computer system 12 is not conveniently reachable. In addition, the thick client components provided to the thick client platform on the client computer system 10 may be stored, distributed and managed using the same application component infrastructure on the server computer system 12 as is used with respect to the corresponding thin client components provided to the thin client platform.

In terms of performance, by moving the user interface 22, workspace 24, and optionally portions of the services and data layers to the client computer system 10, operation of the thick client platform 16 results in significant performance gains over typical thin client platform operation. These advantages result at least in part from a reduction in communication overhead between the client computer system 10 and the server computer system 12 when the user interface 22 and workspace 24 components are local to the client computer system 10. Moreover, the thick client platform 16 is installed locally on the client computer system 10, and can accordingly make direct use of native resources on the client computer system 10, including such native resources as the operating system of the client computer system 10, versions of components such as widgets that are native to the client computer system 10, and the local file system of the client computer 10.

Figure 2:
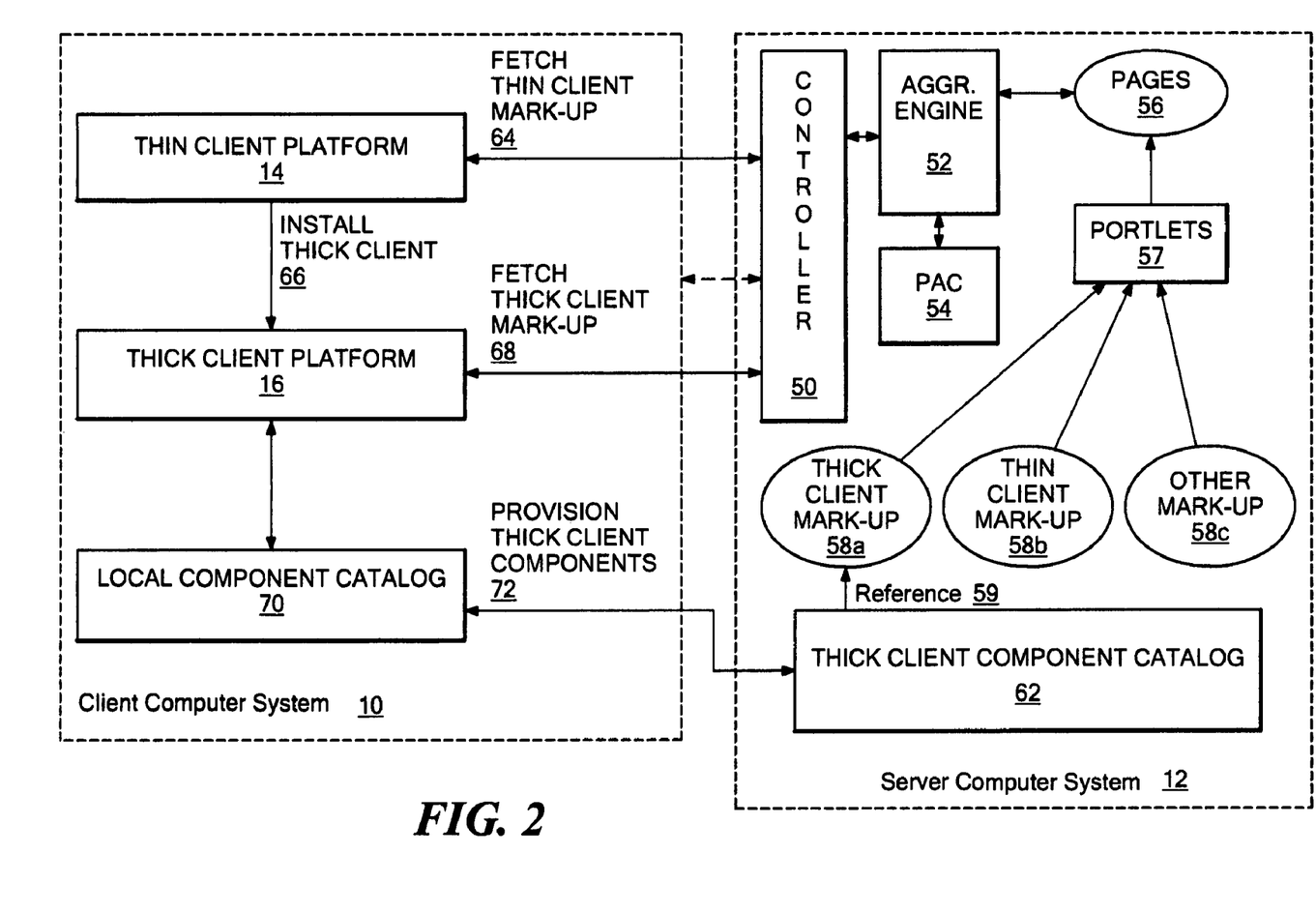
FIG. 2 shows further illustrates operation of software components executing on client and server computer systems in an illustrative embodiment.

FIG. 2 illustrates operation of software components executing on the client computer system 10 and server computer system 12 in an illustrative embodiment. As shown in FIG. 2, the thin client platform 14 operates by fetching 64 thin client mark-up from the server computer system 12. Requests for thin client mark-up are received by the controller component 50 on the server 12. These requests may be page requests that are processed at least in part by the aggregation engine 52 on the server computer system. The aggregation engine 52 operates using access control information to determine what services and data can be provided to which users and/or devices indicated in the received requests. For example, a portal access control component shown as PAC 54 may be employed for this purpose. Based on such access controls, the aggregation engine 52 operates to collect pages 56, each of which may reference one or more application components. For example, a portal page provided through a browser program thin client platform may include references to components consisting of portlets. In order to return the mark-up for such requested pages, server 12 processes client request headers and produces markup corresponding to the requested type. Page requests from the thin client platform 14 include an indication that they are for use in the thin client platform 14, and are satisfied by obtaining thin client mark-up 58*b*. Such thin client mark-up code 58*b* may, for example, consist of HTML (HyperText Mark-up Language) code. The thin client mark-up 58*b* for each page being aggregated is then returned to the thin client platform 14 for rendering to the user. If specific application components are then needed by the thin client 14, further requests may be required through the controller 50 and page aggregator 52 to obtain the appropriate thin client mark-up 58*b*.

Each pre-defined thick client component stored in the component catalog 62 may have multiple versions and can be requested from the client 16. The component catalog 62 may include all components for the thick client platform on the client computer system 10, including components for the user interface 22, workspace 24, services 26 and data 28. For example, if service provider developed a new collaboration tool, the tool could be stored in the component catalog 62. When a user clicks on a link to the tool in a user interface page, the tool is fetched and downloaded to the client computer system as a thick client component.

In another example, when a request for a page including one or more electronic mail application components, such as a message folder navigator, contact list, inbox, etc., is received at the server 12, a determination is made as to the source of the request. The source of the request determines which mark-up for that page is returned to the client computer system 10. If the requester is the thin client platform 14, then thin client mark-up 58*b* is returned. If the requester is the thick client platform 16, then thick client mark-up 58*a* for the requested page is returned. Thick client mark-up 58*a* includes references 59 to predefined components in the thick client component catalog 62, for example within a resultant thick client mark-up document transmitted to and processed at the client computer system. Such references in the document may be used to fetch components from the thick client component catalog 62 that are not already present in the local component catalog 70. Other request sources, such as mobile phones or other devices, may similarly result in returning of appropriate mark-ups, shown for purposes of explanation as other mark-up 58*c*.

The thick client platform 16 may be installed 66 through a user selecting a URL (Uniform Resource Locator) through the user interface provided by the thin client platform 14. Alternatively, the thick client platform 16 may be installed on the client computer system 10 in some other way, such as being loaded from a removable program storage media. Upon initial installation of the thick client platform 16, after the appropriate thick client platform 16 is selected matching the type and configuration of the client computer system 10, and loaded onto the client computer system 10, the thick client platform 16 makes a call 68 to the server computer system 12 to fetch thick client markup that defines view and perspective layout metadata, as well as service metadata, component inline data, and component update metadata that will be used to create the display to be provided to the user. The request for thick client markup to the server computer system 12 may include a device type and a requested mark-up type. The device type in this case would indicate the thick client platform on the client computer system, and the requested mark-up type may further indicate that thick client mark-up is the type of mark-up being requested. The server computer system may accordingly use one or both of these request fields when processing the received request.

In response to the call 68, the server computer system determines 1) the identity of the user, for example based on a previously established user session associated with the call, 2) which components the user is allowed to access, and 3) an appearance for the current page to be displayed. These server-managed management attributes are then used by the server computer system 12 when processing subsequent requests for services or data from the thick client platform 16. For example, the PAC 54 may operate to store user attributes used to control access to data, services, and/or thick client markup by specific users.

Specifically, those application components referenced from a page or pages being displayed through the thick client platform 16 may first be sought from within the local component catalog 70 on the client computer system 10. If one or more components referenced from such a page are not found in the local component catalog 70, then the local component catalog 70 provisions those thick client components 72 by obtaining the thick client mark-up for those components from the server component catalog 62.

Figure 3:
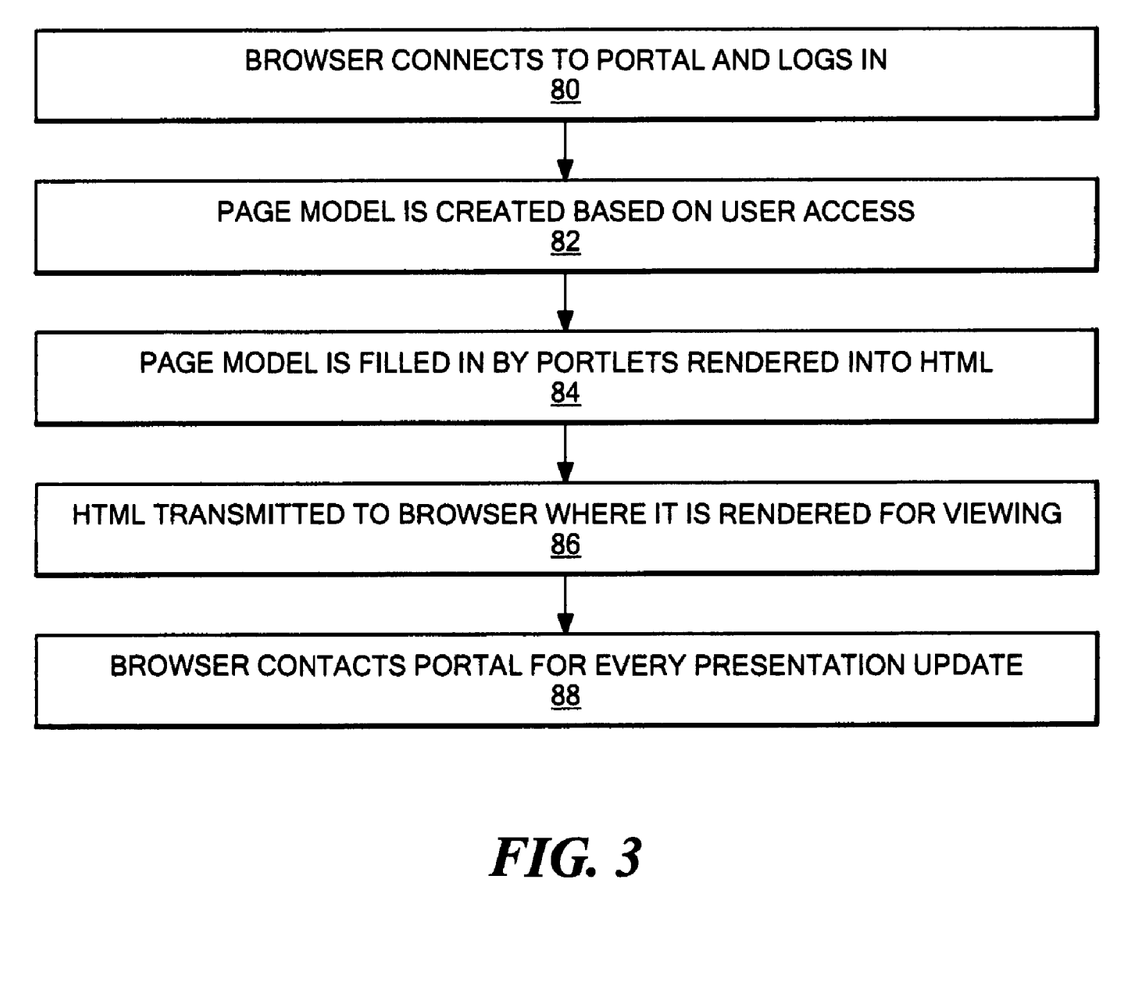
FIG. 3 is a flow chart illustrating steps performed providing a thin client platform using a thin client infrastructure.

FIG. 3 is a flow chart illustrating steps performed providing a thin client platform using a thin client infrastructure. For purposes of explanation, the thin client discussed with reference to FIG. 3 is a browser program, and the page or pages being sought are portal Web pages of a portal Web site. Each of the portal pages may be populated by multiple portlets, each of which corresponds to an application component available through the portal page. As shown in FIG. 3, at step 80, the browser connects to the portal, for example in response to a user entering user name and password or other credentials that are passed to a server computer system associated with the portal Web page. The server computer system may then operate to determine various access rights associated with the user that has logged in to the portal, as well as which data and/or configuration, settings, preferences or state to be used when a page model for the portal is created at step 82. Such user specific information may be persisted on the server computer system to provide such user interface settings as those determining whether a stock quote system provides quotes in ascending or descending order, or any other specific setting. At step 84, the server computer system operates to fill in the page model created at step 82 with those portlet application components referenced in the page model. The portlet application components used in step 84 are represented in thin client mark-up, i.e. rendered into HTML for the thin client to use. At step 86, the HTML for the page model and the portlet application components referenced in the page model is transmitted back to the client computer system, where the browser program renders the HTML for viewing by the user. At step 88, the browser thin client must operate to contact the portal Web site for every update to the presentation of the user interface, potentially resulting in significant communication overhead.

Figure 4:
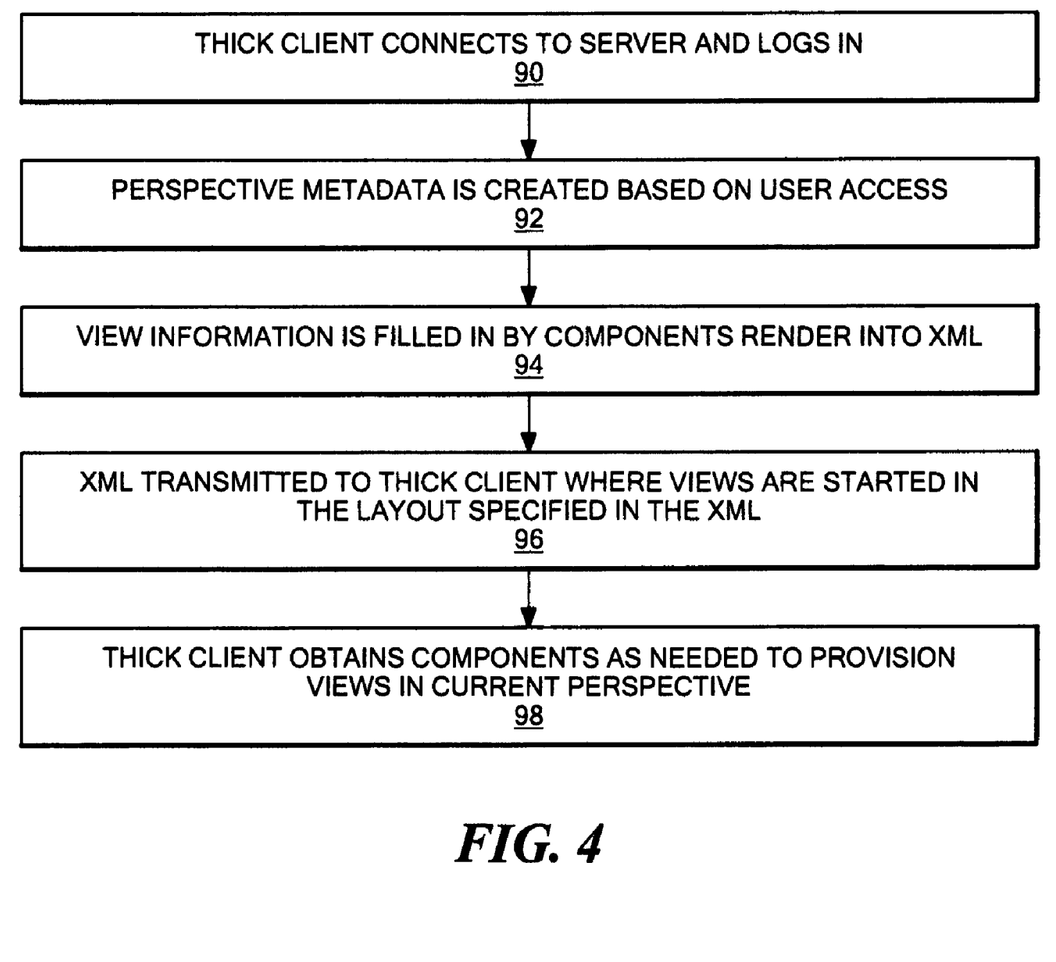
FIG. 4 is a flow chart illustrating steps performed in an illustrative embodiment of the disclosed system to provide a thick client.

FIG. 4 is a flow chart illustrating steps performed in an illustrative embodiment of the disclosed system to provide a thick client platform. For purposes of explanation, the terms perspective and view are used in describing the steps shown in FIG. 4, consistent with the nomenclature of Eclipse, which is an open source Java-based platform for integrating software tools for application development. Whereas the term "page" is used to describe to a screen display that can be presented to a user of a thin client on a display device, the corresponding Eclipse term used to describe thick client operation in FIG. 4 is "perspective". Similarly, whereas the term "portlet" is used to describe portions of a portal "page" that include application components provided through a thin client, the corresponding Eclipse term used to describe a thick client application component within a perspective is "view". Those skilled in the art will recognize that the Eclipse terminology is used here only for the sake of convenience, and that the present invention is not limited to embodiments that use Eclipse techniques or constructs.

At step 90 of FIG. 4, the thick client platform connects to the server computer system, and logs the user in. The log in performed at step 90 may again be performed using a user name and password, or other appropriate credentials, and be processed using the same server side authentication components as were used when authenticating a user through the thin client platform as described in FIG. 3. The server computer system may operate to determine various access rights associated with the user, as well as which data and/or configuration or settings to use, through these same authentication components. At step 92, a perspective metadata document is created on the server based on the data and services that the user is authorized to access, as well the settings and configuration information associated with the user. Each view within the perspective is then filled in using the thick client mark-up for the associated application components at step 94. In the embodiment described in FIG. 4, the thick client mark-up obtained for the perspective and the views referenced in the perspective, is based, for purposes of example, on XML (eXtensible Mark-up Language). At step 96, the thick client mark-up (XML) is transmitted to the thick client platform, where the views are started in the layout specified in the perspective XML. As new thick client components are required corresponding to changes in the current perspective displayed through the thick client platform, at step 98 the thick client obtains those thick client mark-up components needed from the server system to provision the modified views.

Figure 5:
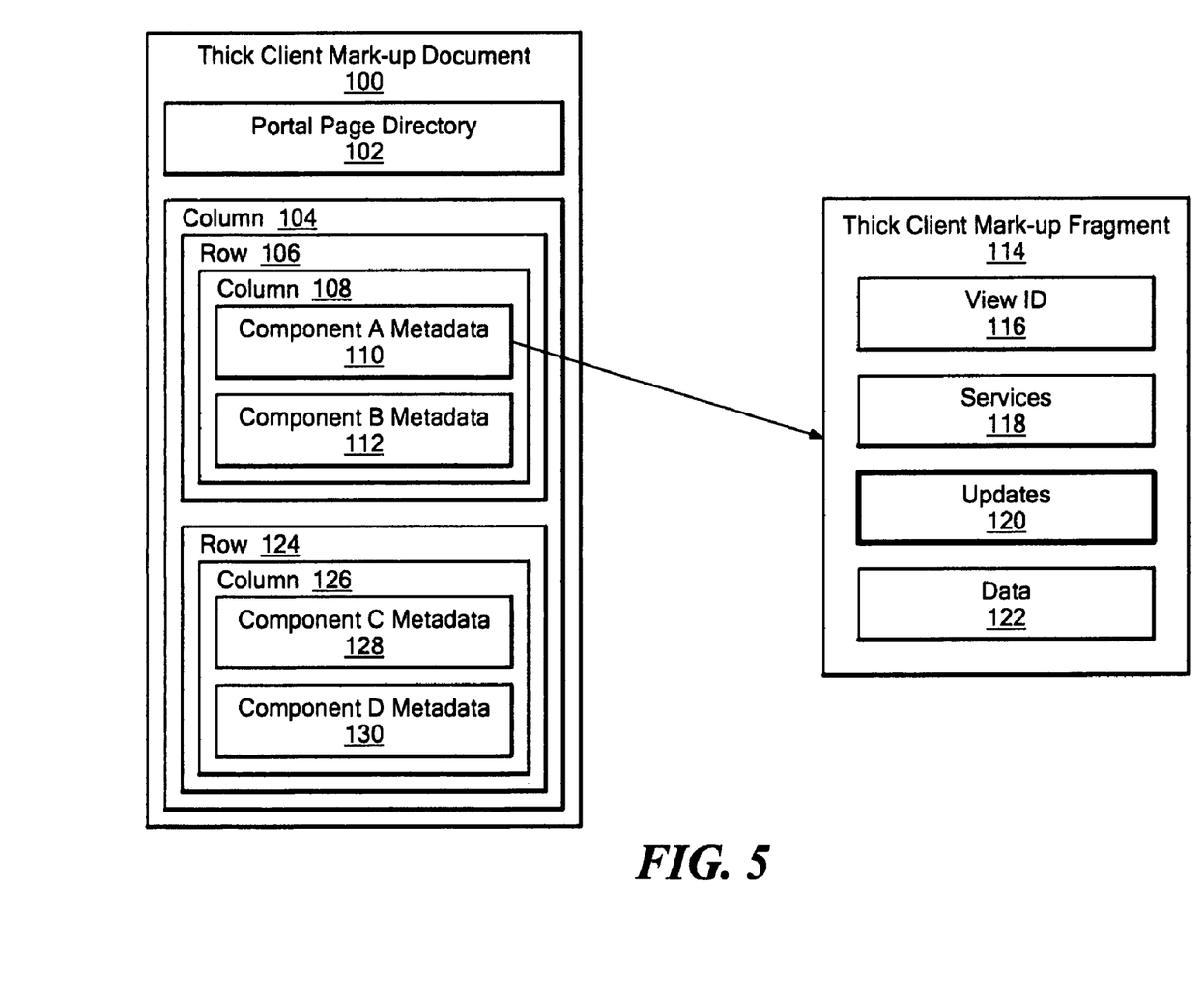
FIG. 5 shows an example of structure for a thick client mark-up document consistent with an embodiment of the disclosed system.

FIG. 5 shows an example of structure for a thick client mark-up document consistent with an embodiment of the disclosed system. The document structure in FIG. 5 describes a current page for display through a user interface. As it is generally known, a page, in this context, may also sometimes be referred to as a "screen" or "perspective". Subsequently, other pages may be brought into the thick client platform as needed. The document structure of FIG. 5 provides a column and row layout scheme, enabling positioning of components within the page.

As shown in FIG. 5, an example of a thick client mark-up document 100, corresponding for example to a perspective created in step 92 of FIG. 4, describes the layout of a current screen display in terms component views laid out in a number of rows and columns. The example document 100 is shown including a portal page directory 102. The portal page directory 102 enables building of a navigator component for accessing all pages that the user has access to.

The column 104 is made up of a number of rows, shown including row 106 and row 124. The row 106 includes a column 108, which describes an application component A and an application component B through the component A metadata 110 and component B metadata 112 respectively.

For example, the component A metadata 110 is shown being made up of the thick client mark-up fragment 114. The thick client mark-up fragment 114 includes a view identifier 116, a services portion 118, a requirements portion 120, and a data portion 122. The requirements portion 120 may include update information, indicating how to obtain the associated component if it is not currently on the client computer system. The column 104 further includes the row 124, having column 126 with component C metadata 128 and component D metadata 130.

Figure 6:
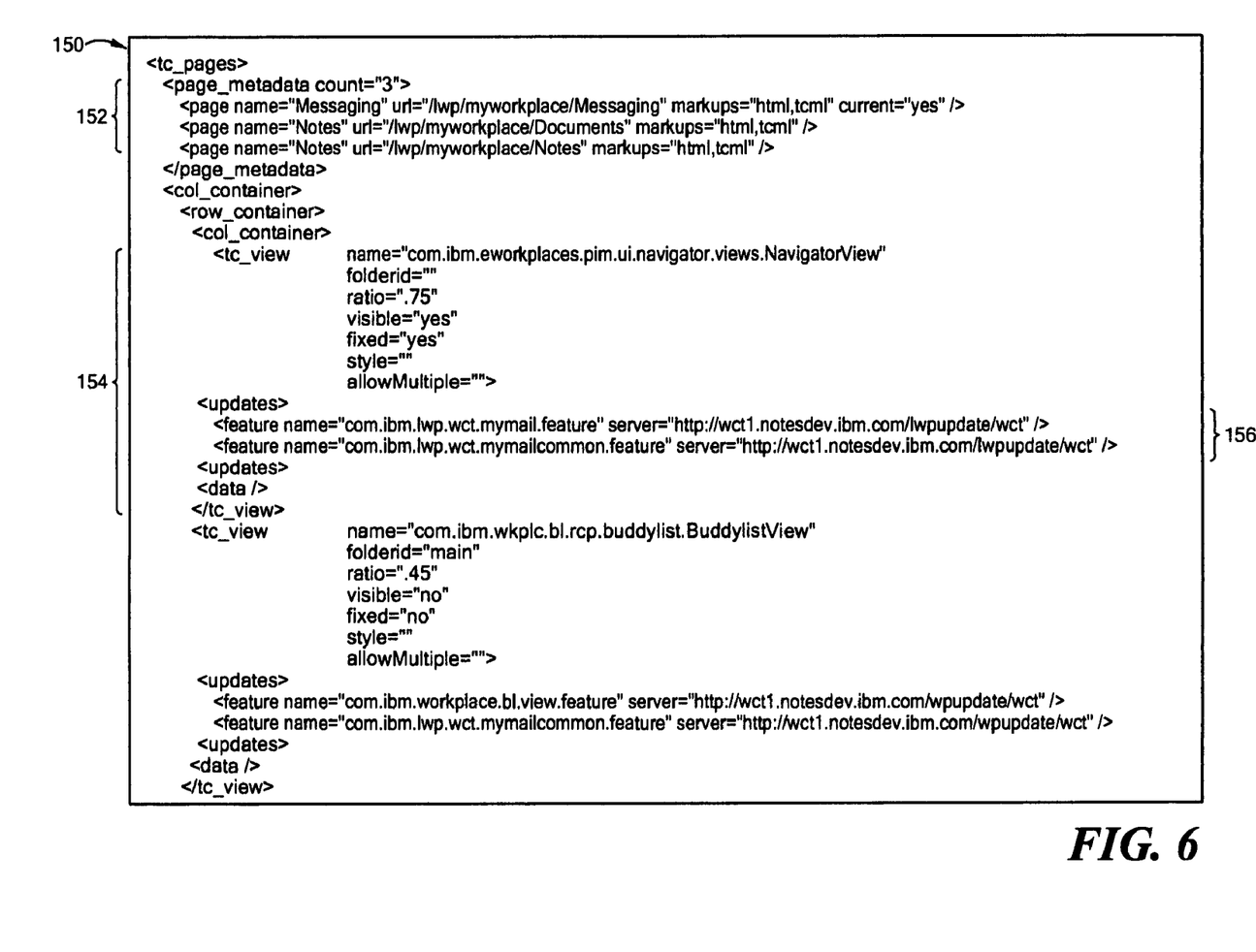
FIG. 6 shows an example of thick client mark-up code consistent with an embodiment of the disclosed system.

FIG. 6 shows an example of thick client mark-up code 150 consistent with an embodiment of the disclosed system. The thick client mark-up code 150 example of FIG. 6 consists, for example, of XML code describing a number of pages that can be accessed by the user. The first and current page of these pages is associated with the page metadata 152, as indicated by the following tag:

<page name="Messaging"url="/lwp/myworkplace/Messaging"markups="html,tcml"current="yes"/>

The page metadata 152 may contain one or more pages. In the example of FIG. 6, the code that next follows within the thick client mark-up code 150 describes the layout of the current page, in terms of column and row containers. An example of a description of a component provided through a page in the thick client platform is shown with respect to the "<tc_view . . . >" tag 154. As shown in FIG. 6, the tag 154 describes a navigator component. A unique identifier:

"com.ibm.eworkplaces.pim.ui.navigator.views.NavigatorView"

identifies the view component, and is followed by some component attributes. An example of an updates component tag is then shown as the <updates> tag 156, which indicates that a feature called "mymail" (e.g. and electronic mail component) can be found at the wct1 server. The tag 156 is used in the client provisioning system to determine the server to connect with to fetch one or more components that are needed by the thick client platform in order to create the display, pass inline data, and initialize the workspace and services associated with the thick client mark-up code 150. The "mymail" feature may further include references to other features and/or other components. Thus there may be a hierarchy of features represented in thick client mark-up, in which the atoms or leaves of the tree result in components. The thick client platform operates to examine this hierarchy of components, determine which ones are locally available without accessing the server computer system, and obtain others from the server computer system.

While the above description includes electronic mail application examples, those skilled in the art will recognize that the present system is not so limited. Accordingly, any specific application may be provided through the disclosed system in a way that enables a thick client platform to provide components of the application in a way that allows the application to be managed on a central server system in the same way that application is or may be managed for access through thin client platforms. Thus applications provided through the thick client platform can conveniently be controlled in terms of what services and data are provided to specific users. The disclosed system further enables services and data to be provided in a consistent way across accesses by or sessions with a user by way of multiple, different client platforms.

FIGS. 1-4 are block diagram and flowchart illustrations of methods, apparatus(s) and computer program products according to an embodiment of the invention. It will be understood that each block of FIGS. 1-4, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program command structures, one skilled in the art will recognize that the may be embodied using a variety of specific command structures.

We claim:

1. A method of providing a thick client application platform on a client computer system, comprising:

receiving a page request at a server computer system;

detecting, by said server computer system, that said request is on behalf of said thick client application platform, wherein at least one thin client application container component is embedded within said thick client application platform;

selecting, by said server computer system, responsive to said detecting that said request is on behalf of said thick client application platform, a thick client mark-up document reflecting attributes of a user associated with said request, wherein said attributes are managed through said server computer system;

sending said selected thick client mark-up document to said client computer system; and loading a workspace component to said client computer system, wherein said workspace component is operable to communicate with a services layer on said server computer system in support of said thick client platform.

2. The method of claim 1, further comprising:
- detecting, at said client computer system, that at least one application component referenced by said thick client mark-up document is not stored on said client computer system; and
- responsive to said detecting that said at least one application component referenced by said thick client mark-up document is not stored on said client computer system, requesting said at least one application component from said server computer system.

3. The method of claim 2, further comprising:
- loading a local component catalog onto said client computer system; and
- wherein said detecting that at least one application component referenced by said thick client mark-up document is not stored on said client computer system is responsive to said local component catalog.

4. The method of claim 1, further comprising:
- loading a user interface component to said client computer system for use with said thick client platform, wherein said user interface component is operable to provide user interface display objects within said thick client application platform by executing program code on said client computer system.

5. The method of claim 1, wherein said attributes of said user include access rights corresponding to at least one application component provided by said server computer system through said thick client application platform.

6. The method of claim 1, wherein said attributes of said user include settings describing at least one aspect of a user interface display screen to be provided to said user through said thick client application platform.

7. The method of claim 1, wherein said at least one thin client application container component comprises a Web browser.

8. A system comprising:
- at least one computer readable memory, said computer readable memory having stored thereon program code for providing a thick client application platform on a client computer system, said program code when executed performing the steps of
  - receiving a page request at a server computer system,
  - detecting, by said server computer system, that said request is on behalf of said thick client application platform, wherein at least one thin client application container component is embedded within said thick client application platform,
  - selecting, by said server computer system, responsive to said detecting that said request is on behalf of said thick client application platform, a thick client mark-up document reflecting attributes of a user associated with said request, wherein said attributes are managed through said server computer system,
  - sending said selected thick client mark-up document to said client computer system, and
  - loading a workspace component to said client computer system, wherein said workspace component is operable to communicate with a services layer on said server computer system in support of said thick client platform.

9. The system of claim 8, said program code when executed further performing the steps of:
- detecting, at said client computer system, that at least one application component referenced by said thick client mark-up document is not stored on said client computer system; and
- responsive to said detecting that said at least one application component referenced by said thick client mark-up document is not stored on said client computer system, requesting said at least one application component from said server computer system.

10. The system of claim 9, said program code when executed further performing the steps of:
- loading a local component catalog onto said client computer system; and
- wherein said detecting that at least one application component referenced by said thick client mark-up document is not stored on said client computer system is responsive to said local component catalog.

11. The system of claim 8, said program code when executed further performing the steps of:
- loading a user interface component to said client computer system for use with said thick client platform, wherein said user interface component is operable to provide user interface display objects within said thick client application platform by executing program code on said client computer system.

12. The system of claim 8, wherein said attributes of said user include access rights corresponding to at least one application component provided by said server computer system through said thick client application platform.

13. The system of claim 8, wherein said attributes of said user include settings describing at least one aspect of a user interface display screen to be provided to said user through said thick client application platform.

14. A computer program product, comprising:
- a computer readable memory, said computer readable memory having stored thereon program code for providing a thick client application platform on a client computer system, said program code when executed performing the steps of
  - receiving a page request at a server computer system,
  - detecting, by said server computer system, that said request is on behalf of said thick client application platform, wherein at least one thin client application container component is embedded within said thick client application platform,
  - selecting, by said server computer system, responsive to said detecting that said request is on behalf of said thick client application platform, a thick client mark-up document reflecting attributes of a user associated with said request, wherein said attributes are managed through said server computer system,
  - sending said selected thick client mark-up document to said client computer system, and
  - loading a workspace component to said client computer system, wherein said workspace component is operable to communicate with a services layer on said server computer system in support of said thick client platform.

* * * * *